June 17, 1930.  R. A. CHARLES  1,763,757
LAWN RAKE AND FERTILIZING MACHINE
Filed Dec. 27, 1927   2 Sheets-Sheet 1

R. A. Charles
Inventor

June 17, 1930. R. A. CHARLES 1,763,757
LAWN RAKE AND FERTILIZING MACHINE
Filed Dec. 27, 1927 2 Sheets-Sheet 2

R. A. Charles
Inventor
By C. A. Snow & Co.
Attorneys.

Patented June 17, 1930

1,763,757

UNITED STATES PATENT OFFICE

REUBEN A. CHARLES, OF GREAT BEND, KANSAS

LAWN RAKE AND FERTILIZING MACHINE

Application filed December 27, 1927. Serial No. 242,935.

This invention has reference to a device especially designed for treating lawns or grass plots and aims to provide novel means whereby grass, leaves or other foreign matter may be conveniently and readily raked from the lawn or grass plot and carried to a place of dumping.

An important object of the invention is to provide a device of this character which may be efficiently employed as a means for distributing fertilizer, top soil or the like, the invention embodying means for agitating the device to impart a shaking movement to the device causing the fertilizer or material container therein, to be distributed over the lawn or grass plot.

A still further object of the invention is the provision of a device of this character which will not injure the grass roots or tear up the surface while in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
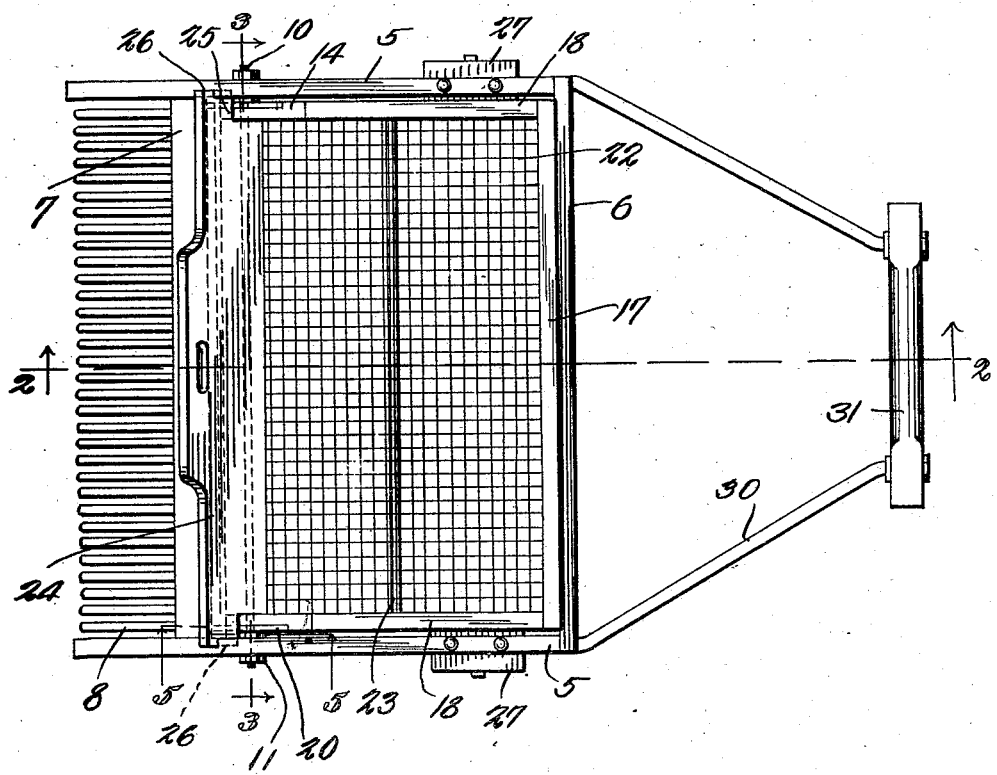
Figure 1 is a plan view of a device constructed in accordance with the invention and illustrating the device as used as a fertilizer or top soil distributor.

Referring to the drawings in detail, the device includes a rectangular frame embodying side bars 5 connected at their rear ends by means of the bars 6 and connected at the forward ends by means of the bar 7, the bar 7 being spaced from the free ends of the bars 5, and supplied with teeth 8 extending forwardly, about eight inches, the lower edges of the teeth lying in a plane with the lower edges 9 of the side bars 5, to eliminate any possibility of the teeth digging into the surface over which the device is being moved to injure the roots of the grass or loosen the soil.

The bar 7 is rabbeted along its upper rear edge as at 7' to fit under the front edge of the receiver and provide a smooth surface at the point of connection. The reference character 10 designates a rod that connects the side members 5, there being provided nuts 11 on the ends of the rods and contacting with the side members 5 for holding the side members against movement.

Figure 2:
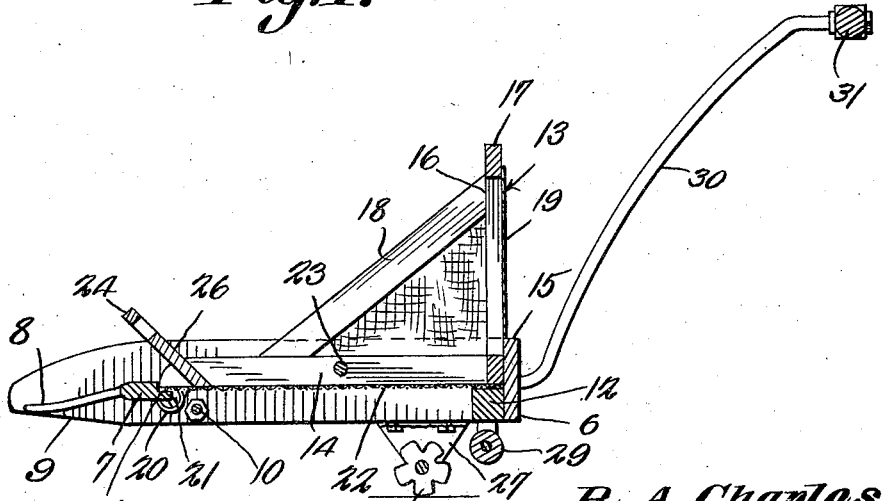
Figure 2 is a sectional view taken on line 2—2 of Figure 1.
Figure 3:
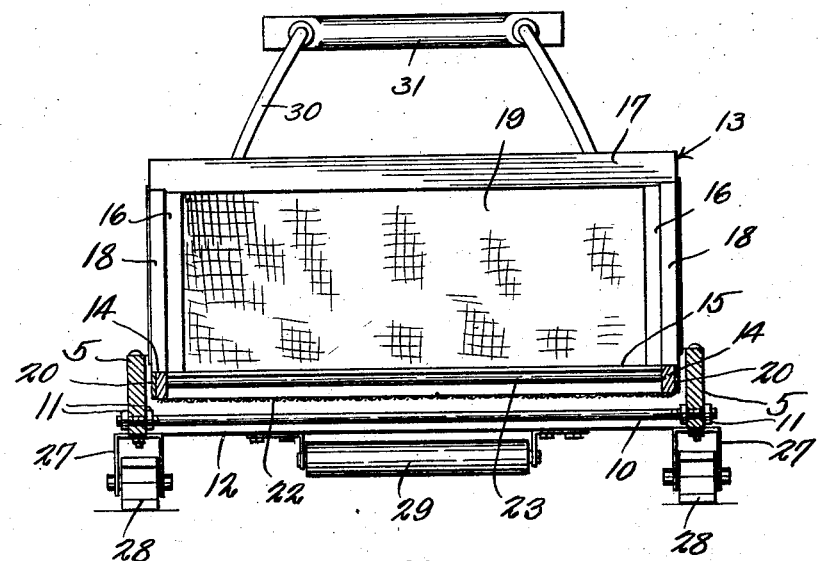
Figure 3 is a transverse sectional view through the device, taken on line 3—3 of Figure 1.
Figure 4:
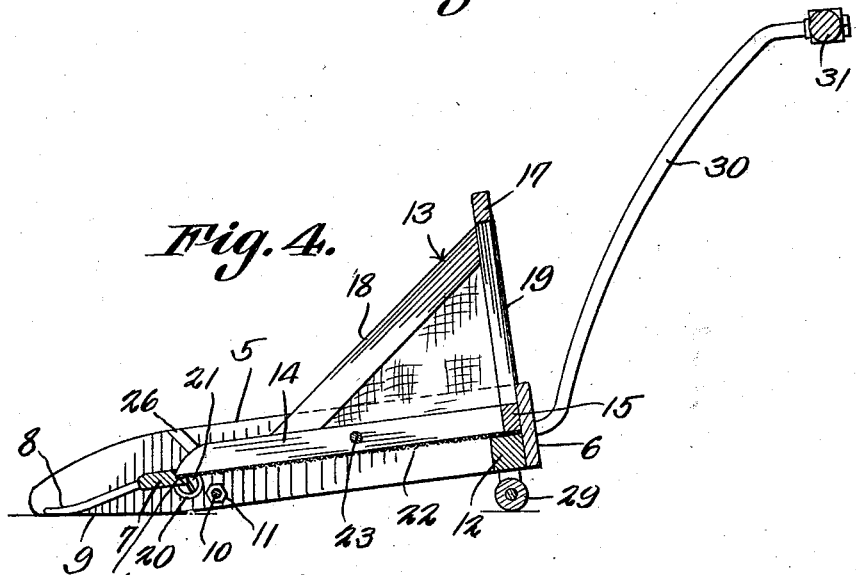
Figure 4 is a longitudinal sectional view through the device showing its application as a lawn rake.

At the rear of the frame is a bar 12 that provides a support for the vertically swinging receiver indicated generally by the reference character 13 so that when the receiver is moved downwardly to its normal position, it will rest on the bar 12 in a manner as shown by Figure 2.

This receiver embodies side members 14 connected by means of the transverse bar 15, and upstanding end bars 16 connected at their upper ends by means of the bar 17. The diagonally disposed bars 18 that connect the bars 14 and 17, provide means to brace the back of the receiver.

At the rear of the carrier and at the sides thereof, are strips of heavy canvas material 19 that prevent the grass or leaves being raked from passing from the device at the rear and sides of the receiver.

Figure 5:
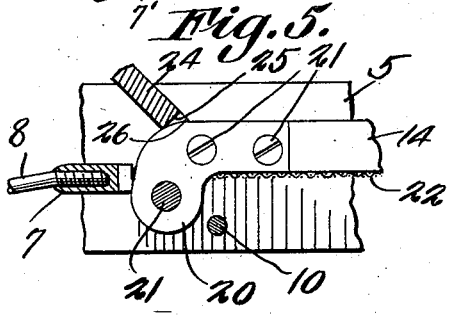
Figure 5 is an enlarged detail view illustrating the manner of connecting the side bars of the frame to the body portion of the device, the section being taken on line 5—5 of Figure 1.

Secured to the forward ends of the side bars 14 of the carrier are bearing members 20 which are pivotally secured to the side bars 5 of the main rectangular frame by means of the screws 21 that pass through suitable openings in the bearing members 20 as clearly set forth by Figure 5.

A covering 22 of wire mesh material connects with the side bars 14 and end bar 15 of the pivoted carrier and affords a bottom for the receiver whereby fertilizer which is usually in a granulated form may be held in the receiver and distributed over a lawn or grass plot, over which the device is moved.

The numeral 23 indicates a rod that connects the side bars 14 of the receiver to further brace the side bars against inward movement.

When the device is used as a fertilizer distributor, a removable end gate 24 is slid into position, the end gate having cut away portions defining shoulders 25 that rest on the side bars 14 of the receiver to hold the end gate against downward movement.

Portions of the end gate above the shoulders, slide in the grooves 26 formed in the side bars 5, to the end that the end gate may be readily and easily removed or replaced.

Secured to the under surfaces of the bars 5 are brackets 27 in which the ball bearing mounted agitating rolls 28 operate, the agitating rolls having notches in their peripheries so that when the device is resting on the agitating rolls and moved over the ground surface, the agitating rolls will cause a shaking movement to be imparted to the device to shake the fertilizer carried in the receiver to distribute the material evenly over the ground surface.

When the device is to be used as a rake, the end gate 24 is removed and the brackets 27 removed from the side bars 5 allowing the device to rest on the ball bearing mounted roller 29 supported at the rear of the device and at a point substantially centrally thereof.

Rods 30 extend rearwardly from the device and afford means whereby the handle 31 may be connected to the device with the result that the device may be readily and easily moved along over the ground surface.

It will further be seen that when the end gate is in position, the receiver is held in a position as shown by Figure 2, in other words the end gate acts as a lock to lock the receiver against vertical movement.

I claim:

A distributor of the class described including a frame, a receiver having a bottom formed of wire mesh material, supported by the frame, an inclined end gate removably supported at the forward end of the receiver to normally restrict the passage of material from the forward end of the receiver, a handle at one end of the frame, and agitating rollers on which the frame is mounted.

In testimony that I claim the foregoing as my own, I have hereto affixed my signature.

REUBEN A. CHARLES.